United States Patent [19]
Alburger

[11] 3,896,664
[45] July 29, 1975

[54] ENHANCED STABILITY WATER WASHABLE PENETRANT COMPOSITION AND PROCESS

[76] Inventor: James R. Alburger, 5007 Hillard Ave., La Canada, Calif. 91011

[22] Filed: June 24, 1974

[21] Appl. No.: 482,465

Related U.S. Application Data

[63] Continuation-in-part of Ser. No. 327,306, Jan. 21, 1973, abandoned.

[52] U.S. Cl............ 73/104; 250/302; 252/301.2 P; 252/408
[51] Int. Cl........................ G01n 21/16; C09k 1/00
[58] Field of Search........ 73/104; 252/301.2 P, 408; 250/302

[56] References Cited
UNITED STATES PATENTS

| | | | |
|---|---|---|---|
| 2,636,127 | 4/1953 | De Forest et al. | 252/301.2 P |
| 2,871,697 | 2/1959 | Sockman | 252/301.2 P |
| 3,117,227 | 1/1964 | Pollack | 252/301.2 P |
| 3,386,920 | 6/1968 | Alburger | 252/301.2 P |
| 3,415,112 | 12/1968 | Alburger | 252/301.2 P |
| 3,564,249 | 2/1971 | Molina | 252/301.2 P |
| 3,636,759 | 1/1972 | Alburger | 252/301.2 P |
| 3,748,469 | 7/1973 | Molina | 252/301.2 P |
| 3,814,695 | 6/1974 | Molina | 252/301.2 P |
| 3,838,160 | 9/1974 | Molina | 252/301.2 P |

*Primary Examiner*—John H. Mack
*Assistant Examiner*—Aaron Weisstuch

[57] ABSTRACT

A water-washable inspection penetrant composition and process in which a low-solubility solvent liquid is used as the penetrant vehicle. The solvent liquids of the invention provide enhanced stability of penetrant entrapments in surface flaws, so as to increase the allowable time interval of wash water contact before an excessive depletion of the entrapment occurs. The flaw detecting capability of the water-washable penetrant is thereby improved.

1 Claim, No Drawings

ENHANCED STABILITY WATER WASHABLE PENETRANT COMPOSITION AND PROCESS

This application is a continuation-in-part of my copending application Ser. No. 327,306, filed Jan. 21, 1973, now abandoned, for "Enhanced Stability Water-Washable Penetrant Composition and Process Therefor."

The invention relates to inspection penetrant materials. More particularly, the invention relates to water-washable inspection penetrant compositions which exhibit enhanced values of indication stability in the presence of wash water.

Heretofore, water-washable inspection penetrants have been comprised essentially of a water-dispersible liquid carrier containing a dissolved indicator dye. The liquid penetrant composition is selected or formulated so as to be readily soluble or self-emulsifiable in water. The indicator dye may be a visible-color dye or a fluoroescent dye, but for high sensitivity usage fluorescent dyes are most generally utilized.

In use, the water-washable penetrant is applied to parts to be tested for the presence of surface flaws. After a suitable dwell time, during which the penetrant enters any surface cracks which are present, the test parts are washed with water to remove surface penetrant, leaving entrapments of the tracer-dyed liquid in the surface cracks. Following the wash-removed step, the test parts ae dried and sometimes they are treated with a fine-powder developer which acts to draw out penetrant entrapments to a point where they can be seen. In any event, the parts are inspected for the presence of surface flaws indications, using white light in the case of penetrants containing visible-color dye, or under black light in the case of penetrants containing fluoroscent dyes. Entrapments of dyed penetrant which are retained or developed on a coating of powder particles are detected by their visible color or fluoroscence, as the case may be. Normally, the step of development is considered to be part of the inspection step in the process.

In the past, it has been the practice to formulate water-washable penetrants in such a way that the compositions exhibit a feature of "good washability", such that the surface penetrant is easily removed when test parts are washed with water. Acceptable penetrant formulations have apparently been chosen for their ability to wash quickly so as to provide a relatively clean test surface with a minimum background of residues of dye penetrant. I have discovered that existing water-washable penetrants suffer from a serious drawback, in that they are characterized by an excessive degree of emulsifiability or solubility, such that in the process of wash-removal of surface penetrant, entrapments of penetrant in small, shallow surface flaws are also removed, or at least are depleted to an excessive degree.

I have endeavored to improve the retention of entrapments in flaws by various means. One method which I have devised involves the formulation of so-called gel-forming penetrants, as exemplified by the teachings of my U.S. Pat. Nos. 3,282,843, 3,349,041, and 3,429,826, and my copending application Ser. No. 127,681, filed Mar. 24, 1971, for "Inspection Penetrant Compositions and Processes Employing Balanced Surfactant/Synergist Detergent Systems".

I have also devised various methods of inhibiting the solubility of certain kinds of penetrants (particularly the gel-forming penetrants), by adjustment of the detergent balance of the composition, by introduction of certain solubility-inhibiting chemicals into the penetrant or into the wash water, or by raising the temperature of the wash water above a critical point of solubility inversion, as exemplified by the teachings of my copending application Ser. No. 163,643, filed July 19, 1971, for "Method and Means for Improving Flaw Entrapment Efficiency in Water-Washable Inspection Penetrants."

I have devised a technique for measuring the rate at which flaw indications are depleted by the action of wash water, and I have found it possible to assign values of "Indication Depletion Time Constants" to various materials such as water-washable penetrants, emulsifiers, and solvent removers. In essence, my method of evaluation involves the measurement by photoelectric means, of the loss of brightness of a standardized pattern of indications during the course of remover application, in the present case, the removed being water. The method yields, for each water washable penetrant, a time constant which is a measure of the time in seconds of wash water contact required to deplete the effective magnitude of the flaw entrapment to 50 percent of its initial value. In some cases it may be preferred to state the time constant in terms of the time in seconds of wash water contact required to deplete the brightness of an indication to 50 percent of its initial value. Measurements of Indication Depletion Time Constants are made using a "standard" cracked panel having a pattern of closely spaced cracks or randomly distributed cracks of known effective magnitude.

I have found that the measured rate of indication depletion depends in part on the magnitude of the cracks in the testing panel. I have made and tested various kinds of testing panels in which I have been able to generate crack defects having effective magnitudes varying from less than a micron up to 20 or 30 microns, and where the depth-width ratio of the cracks may vary from about 3 to 1 up to 100 to 1. For many types of penetrant materials, it is practical to determine depletion time constants using a cracked anodic panel of the types described and claimed in my U.S. Pat. Nos. 3,785,936 and 3,791,198, in which the cracks are about 20 microns deep and 6 microns wide.

The significance of the Indication Depletion Time Constant is that in cases where processing conditions require a prolonged contact time of the wash water with the test surface, the Indication Depletion Time Constant must be large, otherwise indications may be lost. By using the methods which I have devised, and which have become standard procedures under Air Force MIL-Specifications and industrial specifications, I have been able to assign Indication Depletion Time Constants to penetrant process materials, and have thus been able to assign ratings of relative indication stability for such materials. It turns out that Indication Depletion Time Constants for typical water-washable pentrants (using a cracked anodic panel for example) fall in the range of from about 3 to 10 seconds, while for certain of the above-mentioned gel-forming penetrants, time constant values may be as high as 40 seconds.

While Indication Depletion Time Constant values in the range of 3 seconds up to about 40 seconds are suitable for most industrial inspection requirements, there are numerous cases where it is necessary to obtain a considerably higher degree of indication stability, as might be provided by water-washable penetrants having Indication Depletion Time Constants in the range of from about 40 seconds up to as much as 6,000 seconds. One such inspection application is in the study of inter-crystalline separations in plated surfaces, or ceramics. Another application is in the testing of molybdenum disilicide heat resistant coatings for the presence of irregularities and discontinuities. In any of these applications, and others, which require extremely high flaw detection sensitivity combined with an extremely high degree of indication stability, it is essential that the water-washable penetrant shall resist the leaching of wash water during the time normally taken for the wash step.

The principal object of the invention, therefore, is to provide waterwashable inspection penetrant compositions with features of enhanced flaw indication stability in the presence of wash water.

Another object of the invention is to provide a method of adjusting and controlling the Indication Depletion Time Constant value of a water-washable penetrant to a point within the approximate range of from about 40 seconds up to about 6,000 seconds.

These and other objects of the invention will in part be obvious and will in part become apparent from the following description thereof.

I have discovered a family of solvent liquids which satisfy the requirement of high values of Indication Depletion Time Constant, and I find that such solvent liquids may be suitably defined as solvent liquids which are soluble in water or compatible with water to the extent of from slightly less than 0.01 up to about 3 percent. If a solvent liquid has a water solubility or compatibility much lower than 0.01 percent, then penetrant formulations using such liquid may exhibit an unduly large depletion time constant, making wash removal or unwanted background indications excessively difficult. On the other hand, if the compatibility with water of the solvent liquid is much greater than 3%, then the depletion time constant becomes small, to the point where there is no advantage gained over materials already available which provide depletion time constants up to about 40 seconds.

It will be understood that the term "compatibility with water" refers to either the solubility of a liquid in water or the solubility of water in the liquid. It appears that the removal of penetrant entrapments from crack defects by wash with water takes place by a mechanism of diffusion of the two liquids, penetrant and water, into each other, and wash-removability of penetrant may take place at an acceptable rate provided that the solubility of water in the penetrant or penetrant in water fall within the above-stated percentage range. The percentage range of water compatibility of from slightly less than .01% up to 3% is given merely to indicate the physical-chemical property (with respect to water-solubility) of the solvent liquids which are suitable for the purpose of the invention.

The penetrant compositions of the invention are comprised essentially of one or more low-solubility liquids drawn from the group to be described and identified below, the low-solubility liquids being selectively employed, singly and in combination. When so used, these liquids will provide Indication Depletion Time Constants within the range of about 40 to 6,000 seconds. Among the various solvent liquids which are suitable as ingredients in the water-washable penetrants of the invention are:

2-ethylbutanol,
2-ethylhexanol,
iso-octanol,
iso-decanol,
decyl alcohol,
2,6,8-trimethyl-4-nonanol,
isopropyl acetate,
butyl acetate,
isobutyl acetate,
primary amyl acetate,
methyl amyl acetate,
phenyl acetate,
ethyl hexyl acetate,
ethylene glycol monobutyl ether acetate,
glyceryl triacetate,
allylidene diacetate,
methyl allylidene diacetate,
ethyl acetoacetate,
methyl vinyl acetate,
diethyl succinate,
2-ethyl-1,3-hexanediol,
methyl isobutyl ketone,
methyl propyl ketone,
isophorone,
mesityl oxide,
methyl-n-amyl ketone,
methyl isoamyl ketone,
ethylbutyl ketone,
di-isobutyl ketone,
1-pentanol,
2-methyl-1-butanol,
3-methyl-1-butanol,
amyl alcohol,
di-isobutyl carbinol,
isobutyl heptyl ketone,
methyl isobutyl carbinol,
propyl acetate,
styrene oxide,
polypropylene glycol (Mol. Wt. 1025),
ethylene glycol monobutyl ether acetate,
diethylene glycol monobutyl ether acetate,
di-(2-ethylhexyl)-adipate,
triethylene glycol di-(2-ethylbutyrate),
triethylene glycol di-(2-ethylhexoate),
polyethylene glycol di-(2-ethylhexoate),
dimethyl phthalate,
dibutyl phthalate,
di-isobutyl phthalate,
n-octyl,n-decyl phthalate,
n-hexyl,n-octyl, n-decyl phthalate,
di-(n-hexyl) phthalate,
di-(2-ethylhexyl) tetrahydrophthalate,
aliphatic mineral oils,
low-solubility polyoxyalkylene glycols,
low-solubility mono and diethers of polyoxyalkylene glycols, and
dioctyl phthalate.

Any one or a combination of the above-identified solvent liquids, when used as a carrier for an indicator dye, may be employed as a water-washable penetrant and may provide an Indication Depletion Time Constant within the desired range of from about 40 to 6,000 seconds.

With respect to aliphatic mineral oils, these may be distillate fractions of the kerosene type, or they may be heavier distillates similar to diesel fuels or so-called "absorption oils." The aliphatic mineral oils may also include light lube oils such as those which are commercially available under the trade designation "Pacific Base Oil", ranging in viscosity from 50 Saybolt Universal Seconds (S.U.S.) at 100° F. up to several hundred seconds. Refined light oils such as "Insulating Oil," "White Oil," or "Cosmetic Oil," also fall in this category.

I have found that even though aliphatic mineral oils are normally considered to be water insoluble, they exhibit a distinctly different characteristic with respect to water dispersibility, than do aromatic oils, being much more readily water dispersible. They are therefore useful for the purpose of this invention.

All mineral oils are distillate fractions consisting of mixtures of various chemical compounds having different molecular weights and boiling ranges. Also, even aliphatic mineral oils usually contain a few percent of aromatic constituents, kerosene for example being available in various grades of refinement ranging from about 1 up to about 17 percent aromatics. It will be understood that the aliphatic mineral oils referred to here are considered to be predominantly aliphatic, with a minimum amount of aromatic content consistent with commercial availability. In general, aliphatic oils useful for the purpose of the invention may have aniline points ranging from about 110° F. up to about 180° F. Oils which have flash points above 200° F. are preferred, but in some cases flash points as low as 125° F. may be acceptable in the light of certain industrial safety requirements.

With respect to low-solubility polyoxyalkylene glycols, these materials may be represented by the general formula:

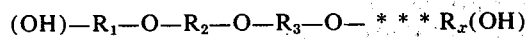

in which $R_1$, $R_2$, etc. are aliphatic groups and may be all the same group or may be different groups in various combinations. The length of the oxyalkylene chain in this formula may be sufficient to provide a molecular weight ranging from about 200 to 1,000 or more. For the purpose of this invention, the lower molecular weight materials are preferred, since they provide low viscosity which permits easy handling of the lenetrant liquids.

The ether derivitives of the polyoxyalkylene glycols may be either aliphatic monoethers or aliphatic diethers, respectively represented by the following formulas:

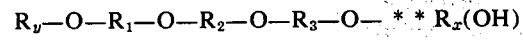

and

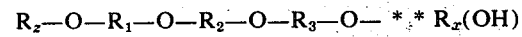

in which $R_y$ and $R_z$ are aliphatic groups having from one to about ten or twelve carbon atoms.

The glycols and their ether derivitives include the various compositions described and claimed in U.S. Pat. Nos. 2,425,753, 2,425,845, 2,448,664 and 2,520,611. Of the various substances thus described, only those which are normally considered to be water-insoluble are suitable for the purpose of the present invention. These liquids are available commercially under the trade designation "Ucon" lubricants, of the LB series or DLB series.

It will be understood that many, if not all, of the low-solubility liquids identified above have been at one time or another utilized as ingredients in post-emulsifier type penetrants, or at least have been tried for such usage. However, the materials are normally considered to be "water-insoluble," and they have thus been contraindicated as ingredients in water-washable penetrants except in cases where an emulsifier or detergent ingredient is included for the purpose of rendering the water-insoluble liquid "self-emulsifiable."

I have noticed that the actual value of Indication Depletion Time Constant which is characteristic of a given penetrant composition may vary as the concentration of indicator dye is varied. Since the flaw detection capability, or "sensitivity," of an inspection penetrant increases as the indicator dye concentration is increased, it follows that for a composition which utilizes a given solvent liquid of the invention, the Indication Depletion Time Constant will change as the sensitivity level (or dye concentration) is changed.

For example, if isodecanol is utilized as the carrier liquid, and if different concentrations of fluoroscent dye are tested, corresponding to relatively low up to relatively high sensitivity levels, as such levels are known in the art, then Indication Depletion Time Constant values may be obtained ranging from about 100 seconds for the low sensitivity composition up to about 5000 seconds for the high sensitivity composition. In a similar manner, ethyl acetoacetate may provide an Indication Depletion Time Constant value of about 40 seconds at relatively low sensitivity levels, while at high sensitivity levels the Indication Depletion Time Constant value may be as high as 1000 seconds. It will be understood that intermediate values of Indication Depletion Time Constants may be obtained by mixing two or more of the solvent liquids of the invention together in various proportions.

In some cases, mixtures of ingredients may be employed for the purpose of providing a specified viscosity characteristic, or as a matter of cost saving. For example, a low-solubility polyalkylene glycol monoether, polymerized monohydroxy, 1,2-polyoxypropylene aliphatic monoethers having a viscosity of about 65 S.U.S. at 100° F. (Ucon LB-65), may be employed as the carrier liquid, whereby Indication Depletion Time Constants are obtained which fall in the range of about 50 to 250 seconds. When about 80 percent of the glycol liquid is deleted and a light mineral oil substituted therefor, the cost of the liquid vehicle is substantially reduced, yet the characteristic depletion time constant remains about the same. A low viscosity penetrant composition may be made by using a mineral distillate fraction of the "absorption oil" or kerosene type, while a higher viscosity material may be made by using a light lube oil such as "Pacific Base Oil — 50 Pale." In both cases, the flaw detection capability and brilliance of indications is about the same as is obtained by use of pure polyoxyalkylene glycol monoether as the carrier vehicle.

A preferred range of Indication Depletion Time Constant values, for use in inspection testing for microstructure of various surfaces, is between 50 and 500 seconds. As pointed out above, certain of the low solubility solvent liquids of the invention, in fact most of them, provide Indication Depletion Time Constant values greater than 1000 seconds when used at high levels of indicator dye sensitivity. Thus, it may be found desirable to reduce the time constant of the penetrant composition when used at high levels of dye sensitivity.

I have found that the Indication Depletion Time Constants of the compositions of the invention may be conveniently reduced and adjusted to desired values by the addition of an appropriate amount of a water-soluble solvent coupler. For the purpose of this specification, the designation "solvent coupler" shall be meant to include water-soluble alcohols and glycol-ethers. Among the various solvent couplers which are suitable for use as additives for reducing the Indication Depletion Time Constant are the following:

methanol,
ethanol,
isopropanol,
1-propanol,
2-butanol,
ethylene glycol monobutyl ether,
ethylene glycol monomethyl ether,
ethylene glycol monoethyl ether,
diethylene glycol monoethyl ether,
diethylene glycol monomethyl ether,
diethylene glycol monobutyl ether,
butoxytriglycol,
methoxytriglycol,
ethoxytriglycol, and
1-butoxyethoxy-2-propanol.

Any of the above-identified solvent couplers may be included in the compositions of the invention at concentrations ranging from zero up to about 40 percent relative to the low-solubility solvent liquid of the invention, the proportional amount used depending on the dye sensitivity which pertains, the particular solvent which is used, and the desired Indication Depletion Time Constant.

Visible-color or fluorescent indicator dye concentrations in the compositions of the invention may range from about .2% up to about 30%, in accordance with known practices.

Accordingly, a water-washable inspection penetrant composition of the invention may be expressed by the following formulation, stated in weight percentages:

| | |
|---|---|
| Low-solubility solvent liquid | 30% to 99.8% |
| Indicator dye | .2% to 30% |
| Solvent coupler | zero to 40% |

Although the invention has been described with reference to particular embodiments thereof, it will be understood that various changes and modifications may be made therein without departing from the spirit of the invention nor the scope of the appended claim.

I claim:

1. In a water-washable inspection penetrant process in which a water-dispersible dyed liquid penetrant is applied to test parts, surface penetrant is removed by washing said test parts with water, and said parts are inspected for residual entrapments of penetrant liquid in surface flaws, the improvement wherein said water-washable penetrant consists essentially of the following formulation, stated in weight percentages:

| | |
|---|---|
| Low-solubility solvent liquid | 30% to 99.8% |
| Indicator dye | .2% to 30% |
| Solvent coupler | zero to 40% | said low-solubility solvent liquid being at least one member selected from the group consisting of:

2-ethylbutanol,
2-ethylhexanol,
iso-octanol,
iso-decanol,
decyl alcohol,
2,6,8-trimethyl-4-nonanol,
isopropyl acetate,
butyl acetate,
isobutyl acetate,
primary amyl acetate,
methyl amyl acetate,
phenyl acetate,
ethyl hexyl acetate,
ethylene glycol monobutyl ether acetate,
glyceryl triacetate,
allylidene diacetate,
methyl allylidene diacetate,
ethyl acetoacetate,
methyl vinyl acetate,
diethyl succinate,
2-ethyl-1,3-hexanediol,
methyl isobutyl ketone,
methyl propyl ketone,
isophorone,
mesityl oxide,
methyl-n-amyl ketone,
methyl isoamyl ketone,
ethylbutyl ketone,
di-isobutyl ketone,
1-pentanol,
2-methyl-1-butanol,
3-methyl-1-butanol,
amyl alcohol,
di-isobutyl carbinol,
isobutyl heptyl ketone,
methyl isobutyl carbinol,
propyl acetate,
styrene oxide,
polypropylene glycol (Mol. Wt. 1025),
ethylene glycol monobutyl ether acetate,
diethylene glycol monobutyl ether acetate,
di-(2-ethylhexyl)-adipate,
triethylene glycol di-(2-ethylbutyrate),
triethylene glycol di-(2-ethylhexoate),
polyethylene glycol di-(2-ethylhexoate),
dimethyl phthalate,
dibutyl phthalate,
dioctyl phthalate,
di-isobutyl phthalate,
n-octyl,n-decyl phthalate,
n-hexyl,n-octyl,n-decyl phthalate,
di-(n-hexyl) phthalate,
di-(2-ethylhexyl) tetrahydrophthalate,
aliphatic mineral oils,
low-solubility polyoxyalkylene glycols, and
low-solubility mono and diethers of polyoxyalkylene glycols,
and said solvent coupler being at least one member selected from the group consisting of:

methanol,
ethanol,
butanol, isopropanol,
1-propanol,
2-butanol,
ethylene glycol monomethyl ether,
ethylene glycol monoethyl ether,
ethylene glycol monobutyl ether,
diethylene glycol monomethyl ether,
diethylene glycol monoethyl ether,
diethylene glycol monobutyl ether,
butoxytriglycol,
methoxytriglycol,
ethoxytriglycol, and
1-butoxyethoxy-2-propanol,
said low-solubility solvent liquids being selectively employed singly and in combination.

* * * * *